FIG. 1.
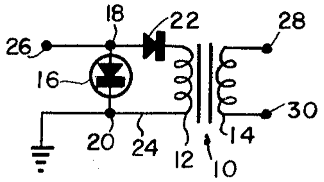
FIG. 2. COMPLEMENTING CIRCUIT
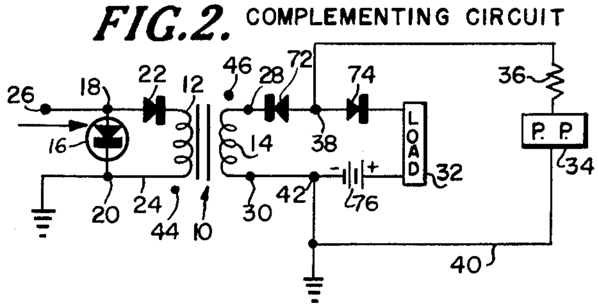
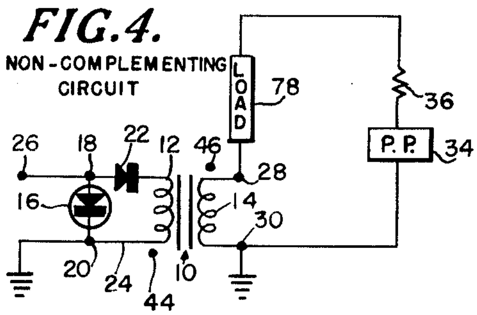
FIG. 4.
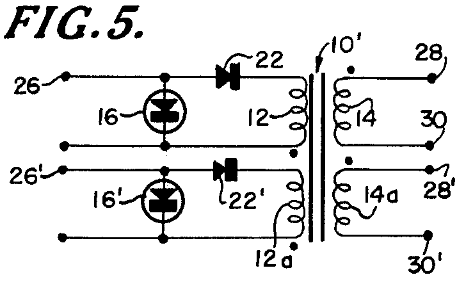
FIG. 5.
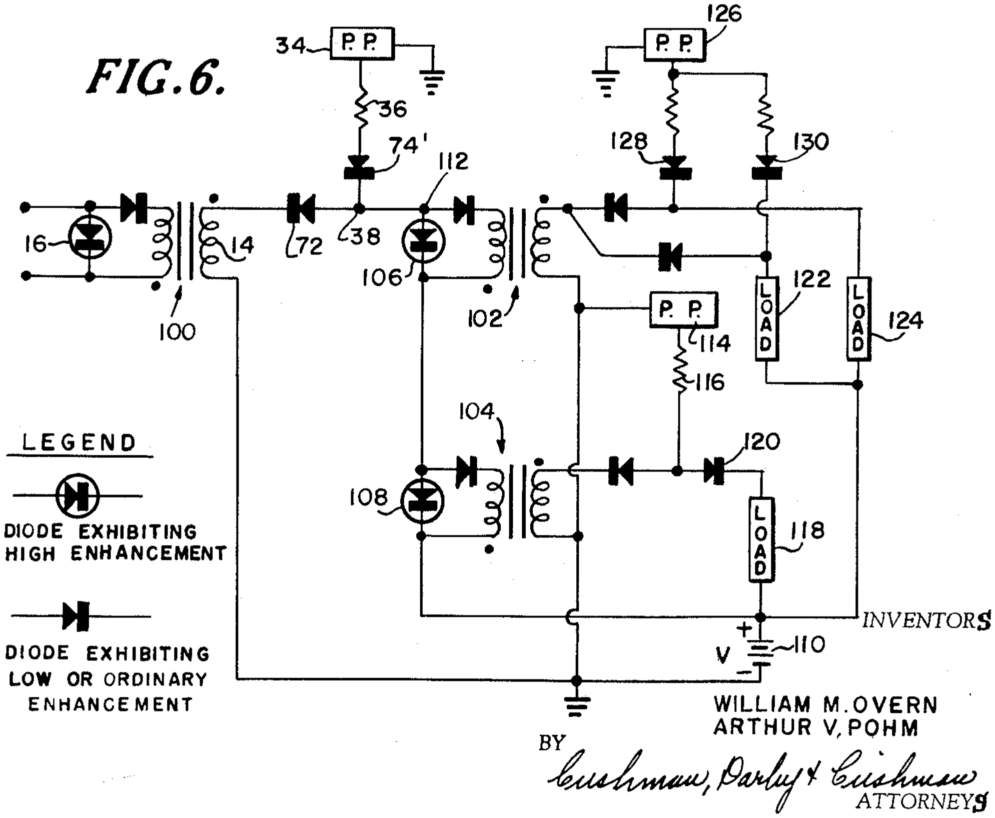
FIG. 6.
INVENTORS
WILLIAM M. OVERN
ARTHUR V. POHM
BY Cushman, Darby & Cushman
ATTORNEYS INVENTORS
WILLIAM M. OVERN
ARTHUR V. POHM
BY Cushman, Darby & Cushman
ATTORNEYS INVENTORS
WILLIAM M. OVERN
ARTHUR V. POHM
BY
Cushman, Darby & Cushman
ATTORNEYS May 14, 1963 W. M. OVERN ETAL 3,089,961

BINARY LOGIC CIRCUITS EMPLOYING TRANSFORMER AND ENHANCEMENT DIODE COMBINATION

Filed Jan. 3, 1958 4 Sheets-Sheet 4

INVENTORS
WILLIAM M. OVERN
ARTHUR V. POHM

BY Cushman, Darby & Cushman
ATTORNEYS

United States Patent Office 3,089,961
Patented May 14, 1963

1 2

3,089,961

BINARY LOGIC CIRCUITS EMPLOYING TRANSFORMER AND ENHANCEMENT DIODE COMBINATION

William M. Overn, Richfield, and Arthur V. Pohm, White Bear Lake, Minn., assignors to Sperry Rand Corporation, New York, N.Y., a corporation of Delaware Filed Jan. 3, 1958, Ser. No. 707,043
23 Claims. (Cl. 307—88.5)

This invention relates to circuits which may be employed with the processing of binary information.

In one aspect, the invention relates to an impedance switch of the diode-transformer type wherein the diode comprises a semi-conductive body exhibiting enhancement properties. The transformer per se preferably has a sloping hysteresis loop characteristic without any exceptional rectangularity imparted thereto, but with said enhancement diode coupled in parallel with the primary winding of the transformer in a series loop including an ordinary, high frequency or low enhancement unidirectional current conducting device such as a regular diode, the resulting circuit forms a bi-stable impedance switch.

Another aspect of the invention involves the use of the foregoing described impedance switch in such a manner that a transfer circuit is formed. A transfer signal source and an output circuit including a load are coupled to a secondary winding of the trnasformer, while input signals are applied to the enhancement diode of the impedance switch. Upon the occurrence of a transfer signal, the input signal previously received is effectively transferred to the load in accordance with the impedance of the transformer. If the input signal was sufficient to store an enhancement charge in the enhancement diode, the impedance switch assumes a relatively low impedance state, and the transfer signal operates to remove at least substantially the enhancement charge, thereby causing an enhancement current and a consequent increase of the impedance of the switch to a relatively higher value. If the input signal is insufficient to cause a substantial enhancement charge, the impedance of the switch remains high and no enhancement current flows upon occurrence of the transfer signal. In accordance with this invention, a transfer circuit may be of the complementary or non-complementary type.

Additionally, another aspect of the invention is the use of power pulses for the transfer signals. In this manner, amplification of the input signals may be accomplished, and this is a highly desirable function of the transfer circuits of this invention. Under such circumstances, the transfer circuits become "diode amplifiers."

Prior art diode amplifiers are devices which employ diode enhancement minority carrier storage to obtain signal power gain by alternately employing one of the diode terminals in the input and then in the output circuit. Power is provided in the form of an alternating or pulsating voltage, preferably in the form of a square wave. The input signal consists of a current pulse flowing through the diode in a forward direction, in series with a low impedance circuit. This results in storage of minority carriers in the diode in consequence of which current flows in the reverse direction (the enhancement current) for a short period of time when the polarity of the power source reverses. When this reverse current is directed, by high frequency diodes, to a high impedance load and is driven at a relatively high voltage, a power gain may result.

Unfortunately, although voltage gain accompanies the power gain, and current gain can also be achieved in certain configurations of prior art diode amplifiers, there is never a charge gain greater than unity. In fact, there is always a net charge loss since current must flow through the diode to affect minority carrier storage, and only the actual charge associated with the stored carriers may contribute to the reverse current. Capacitance is also associated with the diode, but this must be small in order that the amplifier may function, since capacitance reverse currents will appear whether or not an input forward current has occurred. To date, under the best conditions, only 80% of the charge entering the diode is recovered in the operation of prior crystal diode amplifiers.

Since it is necessary for a diode amplifier to exhibit a charge gain, if a number of them are to operate in cascade, a suitable stepdown transformer has been used in prior art diode amplifier output circuits. Two difficulties arise from the use of such a transformer. First, the transformer core loss decreases the power gain of the amplifier, and secondly, the transformer must relax before the next power pulse is applied. In some circuits the "flyback" voltages, which occur as the transformer relaxes following the power or clock pulse and simultaneously with the next input pulse, may interfere with the signal. However, if the flyback time constant is too great, it limits the frequency of the amplifier, and if the transformer does not completely recover between pulses, undesirable transients may be introduced. It is possible to de-couple the transformer from the circuit during flyback time through the use of high frequency or low enhancement diodes properly connected to the power source.

Another serious loss in gain associated wtih prior art diode amplifiers results from the necessity for the power pulse to appear in series with the enhancement diode during the input pulse. The clock or power source must become a very low impedance during the input part of the cycle. This is difficult to achieve. The result is that the input pulse must transmit enough power not only to enhance the diode, but also to supply the losses in the power pulse source.

The major difficulties of prior art diode amplifiers, then, are the limitation of gain caused by the charge loss in the diode and practical transformer ratios, transformer relaxation problems, and power absorption by the clock during signal injection.

In accordance with this invention the gain available from the transfer circuit employing the aforesaid impedance switch is not limited by the magnitude of the charge stored in the enhancement diode.

It is therefore a primary object of this invention to provide an improved impedance switch.

Another object of this invention is the provision of a bi-stable impedance switch employing a semi-conductive enhancement type body in parallel with the primary winding of a transformer so as to be in a series loop including a unidirectional device of low enhancement properties.

Another object of this invention is the provision of a transfer circuit employing the improved impedance switch along with a transfer signal source and a load coupled to the output winding of the switch so as to provide effective transfer of input signals provided to the switch.

Another object of this invention in conjunction with the last preceding object is the provision of such a transfer circuit which has amplification properties whereby the usable power gain is independent of the magnitude of the minority carrier storage in the enhancement body of the impedance switch.

It is a further object of this invention to provide a diode amplifier in which virtually all of the input signal power is applied to the enhancement diode.

A still further object of this invention in conjunction with any o fthe foregoing objects is the provision in a transfer circuit of the diode-transformer type of less critical flyback behavior of the transformer.

Yet another object of this invention is the provision of logical circuits and shifting registers constructed in accordance with any of the foregoing objects.

Still other objects of this invention will become apparent to those of ordinary skill in the art by reference to the following detailed description of the exemplary embodiments of the apparatus and the appended claims. The various features of the exemplary embodiments according to the invention may be best understood with reference to the accompanying drawings, wherein:

FIGURE 1 illustrates an impedance switch;

FIGURE 2 illustrates a complementing transfer circuit employing the impedance switch of FIGURE 1;

FIGURE 4 illustrates a non-complementing transfer circuit employing the impedance switch of FIGURE 1;

FIGURE 5 illustrates another embodiment of an impedance switch;

FIGURE 6 illustrates a transfer circuit with multiple outputs;

Figure 3:
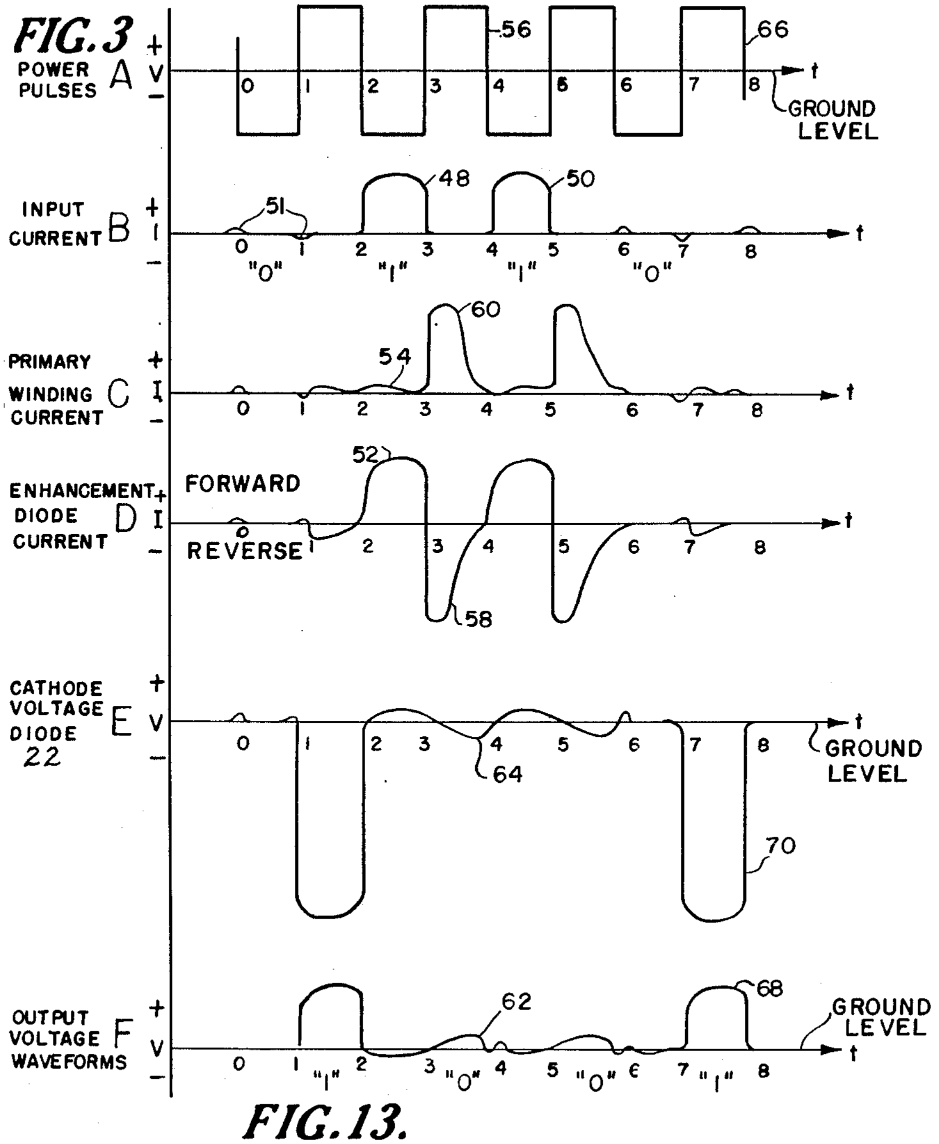
FIGURE 3 illustrates waveforms which may be expected from the embodiment of this invention shown in FIGURE 2.

The impedance switch of FIGURE 1 includes a transformer 10 which has a primary winding 12 and a secondary winding 14, along with a semi-conductive body 16 in parallel with the primary winding 12. The semi-conductive body 16 is of the type which exhibits enhancement properties, i.e., a relatively large reverse current characteristic when the voltage thereacross is changed from a forward to a reverse direction. That is, a current flowing from junction 18 downwardly stores minority carriers, which may be conveniently termed an "enhancement charge," a reverse voltage subsequently applied across the semi-conductive body 16, i.e., to junctions 20 and 18, causes a relatively large transient current of short duration from the semi-conductive body to appear at junction 18. Such a transient current is herein referred to as an "enhancement current." For convenience, the semi-conductive body 16 will herein be referred to as an "enhancement diode."

Also included in the impedance switch of FIGURE 1 is a unidirectional current conducting device, such as diode 22, which preferably has high frequency, low enhancement, or fast recovery characteristics. Diode 22 is connected in a series loop with the primary winding 12 and enhancement diode 16 and in opposition to the latter. That is, diodes 16 and 22 are placed back-to-back with their anodes directly connected together in such a manner that their cathodes are separated in the series loop by primary winding 12. It will be obvious to those skilled in the art that high frequency diode 22 could as well be connected in the series loop in line 24 with the anodes of the two diodes being separated by winding 12, as long as the diode is in between the enhancement diode 16 and winding 12.

The arrangement of the impedance switch of FIGURE 1 is such that when junction 18 is positive with respect to junction 20, a substantial current flows through enhancement diode 16, thereby storing an enhancement charge in diode 16, while no or negligible current flows through diode 22 and primary winding 12 due to the combined greater impedance thereof. The only current through diode 22 is due to the forward voltage drop across enhancement diode 16. When junction 18 is not positive with respect to junction 20, no or negligible current flows through the enhancement diode, and consequently, little if any enhancement charge is stored therein. Junction 18 is made positive or not relatively to junction 20 by the signal inputs across terminal 26 and the ground terminal. Input signals which cause junction 18 to be relatively positive to ground potential are herein referred to as "1" input signals, and those input signals which do not move junction 18 relatively positive any substantial degree, are termed "0" input signals.

When no enhancement charge is stored in diode 16, the impedance of the enhancement diode 16 is relatively large in its reverse direction. Since enhancement diode 16 is across primary winding 12, the series impedance of the primary circuit is then also relatively high. On the other hand, when diode 16 has an enhancement charge stored therein, the reverse impedance of the diode is relatively low. At such time the series impedance of the primary circuit is also relatively low. The impedance of the primary circuit therefore may be varied from a relatively high value to a reduced or lower value. As previously indicated, this reduction in impedance may be caused by a positive signal at terminal 26. To change the reverse impedance of the enhancement diode 16 back to a high value, and consequently, to revert the impedanceof the primary circuit to its relatively high value, a reverse current must be drawn through the enhancement diode. This may be done, for example, by introducing to junction 18 a potential negative with respect to ground to scavenge the enhancement charge. An enhancement current then flows upwardly through enhancement diode 16, thereby removing the enhancement charge and returning diode 16 to its high impedance state. Applying such a negative potential to junction 18, however, does not provide voltage across the primary winding because of the presence of diode 22, and consequently no voltage is induced in the secondary winding. Therefore, no output will be noticeable at secondary terminals 28, 30. One way of providing a meaningful output at the secondary terminals 28, 30 and still scavenge the enhancement charge in diode 16, is to cause a positive signal to be present at terminal 28 after an enhancement charge is stored. A system of this sort will be described presently.

From the foregoing it is apparent that the storage and removal of the enhancement charge in diode 16 varies the impedance reflected through transformer 10 between relatively high and low values as to secondary currents caused by voltages appearing more positive at terminal 28 than terminal 30 if windings 12 and 14 are wound relative to each other as shown by dots 44 and 46 in FIGURE 2. With such a winding relationship secondary currents caused by voltages more positive at terminal 30 will always see a high impedance because of the reverse impedance of diode 22. There is no intermediate value of reflected impedance; it is always relatively high or low to secondary currents causing or tending to cause an enhancement current as long as at least a substantially full enhancement charge is stored and at least substantially fully removed. Of course, if the positive signal to junction 18 is not sufficient to store a proper enhancement charge, or if the reverse current through the enhancement diode is insufficient to remove the charge at least substantially, the primary and secondary circuits will experience intermediate impedance values. To obviate this, the forward and reverse currents through enhancement diodes must be of proper size. As an aid in determining what currents are sufficient for storing and removing an enhancement charge, reference may be made to the copending application of G. I. Williams, No. 507,809, filed May 12, 1955, now Patent No. 2,877,451.

With the proper forward and reverse currents for enhancement diode 16, it is apparent that the primary winding 12 reflects the reverse impedance of diode 16 to the secondary winding 14. Therefore, any current between terminals 28 and 30 will see high or low impedance in the secondary winding in accordance with the state of enhancement diode 16. When the primary winding 12 has more turns than winding 14, the impedance ratio, as is well known, between the two windings is the square of the respective number of turns. Consequently, under such circumstances, the impedance reflected to the secondary winding has even a greater differential than that of the primary winding itself. A quite workable step-down transformer might have a turns ratio of 5:1. With such a transformer, it is obvious that the low reverse impedance of enhancement diode 16 appears as a much smaller impedance in winding 14; in fact it appears as a short circuit to most electronic circuits connected to terminals 28 and 30.

With reference now to FIGURE 2, it is seen that the impedance switch circuit of FIGURE 1 may be employed as part of a pulse transfer circuit, with the pulses being transferred in a complementary sense. That is, with load 32 being connected in parallel with the secondary winding 14 of the impedance switch, a "1" input at terminal 26 will provide a "0" output to the load, and a "0" input signal will cause a "1" output signal to the load. This is accomplished in the following manner: A source 34 provides at least one transfer signal through resistor 36 to junction 38, thence to secondary winding 14 or load 32 and back to the source via ground line 40, after each "0" or "1" input signal to terminal 26. Preferably, source 34 provides recurring transfer pulses which are interleaved with the input signals. That is, signals from source 34 appear alternately with the input signals. Such signals are, of course, positive signals and are preferably of the square wave type; they may be the positive pulses from an alternating wave, or may be unidirectional pulses, i.e., ground based, with preference being extended to the former.

As before indicated, a positive transfer signal from source 34 arrives at junction 38 and tends to go through both the secondary winding 14 and load 32 to return to junction 42 and ground potential. However, since at least the major part of the current at junction 38 will take the path of least resistance, it will traverse secondary winding 14 or not in accordance with the effective impedance of the transformer. That is, when the effective impedance of winding 14 is high compared to the impedance of load 32, very little of the current, if any, will pass through winding 14, but most, if not all, will go to load 32. Conversely, when the effective impedance of winding 14 is comparatively low, the load will receive a comparatively small amount of current.

After a "1" input signal to terminal 26, the resulting low impedance reflected to winding 14 reduces the overall secondary circuit impedance and a relatively large current is drawn from power pulse source 34 which is primarily a constant voltage source. The voltage drop across resistor 36 is consequently large and the voltage from junction 38 to ground is relatively low, all in accordance with well known voltage divider principles. Therefore, it is seen that a power pulse following a "1" input signal provides a "0" output signal to load 32 with the primary circuit being completely passive during the occurrence of the power pulse.

Such a "1" input signal to terminal 26 stores an enhancement charge in diode 16, which must be removed. Since primary and secondary windings 12, 14 are wound in opposite directions as may be noted by dots 44 and 46, a current from source 34 entering winding 14 at junction 28 will induce a voltage in primary winding 12 causing a current therein in such a direction that it will flow downward through the winding over line 24 to junction 20 and upward through diode 16 thence through diode 22. That is, as prevoiusly noted, a reverse voltage across enhancement diode 16 causes a momentary enhancement current from the diode. Such reverse current scavenges the enhancement diode causing at least substantial removal of the enhancement charge and thereby returning the reverse impedance of diode 16 to a comparatively high value. The primary circuit of transformer 10 is then reverted to a comparatively high impedance state. The current flowing in secondary winding 14 to cause such a change is of a relatively small value, and may be sufficient to provide complete removal or scavenging of the enhancement charge. This is particularly true when transformer 10 is of the step-down variety so that there is a corresponding step-up of the current therefrom in primary winding 12.

With the enhancement diode returned to its high reverse impedance state, the impedance switch is prepared for another input to terminal 26. If the input signal at that time has an insubstantial value so as to be termed a "0" input signal, little, if any, charge is stored in the enhancement diode 16. Whatever charge is stored is small and is of such a nature that it can never be recovered by the circuit. Therefore, substantially no change in the reverse impedance of diode 16, and consequently, in the effective impedance of secondary winding 14 takes place. A subsequent positive transfer signal from source 34 when arriving at junction 38 finds its least resistance path through load 32 since the impedance of winding 14 is relatively high, and effectively the winding is open circuited. The transfer signal induces, however, a counter e.m.f. in the secondary winding 14 which is reflected to the primary winding 12 as a large negative pulse. Diode 22 prevents any flyback from this induced voltage pulse from causing enhancement diode 16 to conduct in the forward direction. Since the transformer is effectively open circuited, flyback recovery time is minimized. It is apparent then from the foregoing, that a "0" input signal causes a "1" output signal in load 32, i.e., that the transfer circuit of FIGURE 2 is of the complementary type.

The operation of the pulse transfer circuit of FIGURE 2 may have amplification properties. That is, a complementing type amplifier will result when the positive signals from source 34 have greater amplitude than the input signals to terminal 26. In fact, amplification is one of the most advantageous features of the circuit of FIGURE 2. Under such conditions, source 34 pulses may be referred to as power pulses. Since the anode terminal of enhancement diode 16 is time shared by the input and output circuits, amplification is performed on a time sampling basis, for example, by using a two-phase electrical timing system whereby the input signals from source 34 occur at alternating times. As a whole, the circuit in FIGURE 2 may be referred to as a "diode amplifier." Such a device is more adaptable to amplification of signals designated as representing digital or discrete units of binary encoded information in that two discernible operating states are obtainable rather than the amplification of varying amplitudes of input currents. The output of the diode amplifier of FIGURE 2, as before mentioned, is determined by the substantial or insubstantial impedance presented by winding 14 to a sampling electrical signal from source 34.

The operation of the circuit of FIGURE 2 as a diode amplifier may further be clarified by reference to the exemplary waveforms illustrated in FIGURE 3. Line A represents an alternating square wave signal which may issue from power pulse source 34. The large pulses 48 and 50 in line B are representative of "1" input signals to terminal 26, while the small positive and negative pulses, for example, those designated 51, result from the current induced in the input circuit by the transition of the square wave of line A and occur during the beginning and ending of "0" input signal periods. "0" input signals need not necessarily be of zero current value, but do need to be negligible in their effect of storing an enhancement charge in diode 16. When a "1" input signal is presented to terminal 26, most of the current passes through enhancement diode 16, with very little going through diode 22. The relative amounts of currents through these diodes are illustrated in the waveforms of lines C and D, pulse 52 indicating current through enhancement diode 16 and the small pulse 54 being representative of the negligible current through diode 22. The time periods for each of the waveforms in the different lines of FIGURE 3 are noted along the time abscissa by the numbers 0 through 8. These correspond respectively to the successive times when the alternating square wave of line A crosses its zero axis. Following the input signal 48 during the time period 2—3, there is an occurrence in the square wave of a positive pulse 56. Since the effective impedance of the transformer secondary at this time is relatively low, a comparatively large current is drawn from the power pulse source but the resulting relatively small voltage portion of pulse 56 at junction 38 causes the large current to pass mainly through secondary winding 14 which effectively appears as a short circuit. As before explained, this causes an enhancement current from diode 16, which current is a negative pulse 58 of the form indicated in line D at time period 3—4. The current through diode 22 and primary winding 12 resulting from the secondary voltage pulse 56 and the enhanced state of doide 16 is indicated by positive pulse 60 in line C, with the cathode voltage on diode 22 being negative as shown by pulse 64 in line E. Load 32 receives a "0" or negligible output voltage pulse 62 (line F). From the foregoing, it is apparent that during the output phase, i.e., when pulse 56 occurs, for example, that the primary circuit is completely passive in character with all output voltages and currents being caused by the power pulse provided to the secondary circuit. Thus energy flow is opposite to the effective information flow.

Continuing to refer to FIGURE 3, it may be noted that the input current signals of line B occur during the time when there is no positive pulse 56 issuing from the power pulse source 34. That is, with the alternating square wave of line A, the input signals are timed to occur during the negative portions of the square wave. Of course, if the output of power pulse source 34 is unidirectional rather than bidirectional, the input signals would occur when the power pulse source is providing no signal.

When the input signal to terminal 26 of FIGURE 2 is a "0," as for example in time period 6—7 of FIGURE 3, the reflected impedance to the secondary winding is high causing a relatively low current to be drawn from the power pulse source during time period 7—8. Since the voltage drop across resistor 36 is then comparatively low, the portion of voltage pulse 66 which appears across junction 38 and ground is relatively high as is the voltage across load 32 as shown by pulse 68 in line F. The effective impedance of secondary winding 14 is relatively large at this time compared to load 32, and most of the current to junction 38 of FIGURE 2 therefore traverses load 32. Since winding 14 and load 32 are in parallel, the same voltage is across the secondary winding 14. Even though the current in the secondary winding is small, the voltage developed across it because of the large impedance reflected thereto from enhancement diode 16, when stepped-up, induces a large negative voltage pulse across the primary winding 12 at the cathode of diode 22 as is indicated by pulse 70 in line E. This negative induced voltage pulse is large compared to pulse 64, but the current resulting therefrom in the primary is comparatively small. This is due to the high impedance of the transformer primary circuit as caused by the relatively large reverse impedance of enhancement diode 16. Therefore, the reverse current in diode 16 is small as shown in line D at time period 7—8, as is the forward current through diode 22 as seen in line C.

All of the above discussion relative to FIGURE 2 has been given without any mention of unidirectional current conducting devices 72 and 74, or of voltage source 76. Basically, these three components are not essential to the system; however, their presence may improve the operation thereof. Source 76 provides a threshold voltage which opposes current flow from junction 38 through load 32 until the current is sufficient to overcome the bias of source 76. Therefore, such threshold means may be employed, even without unidirectional devices 72 and 74, to prevent false "1" indications to load 32, especially if the load has unidirectional characteristics preventing a secondary loop current from source 76. As above suggested, some of the current at junction 38 divides and tends to flow through load 32 even though the impedance of winding 14 is relatively low. With source 76 in the circuit, the current tending to flow in load 32 is opposed so that the load actually receives negligible, if any, current at such times.

Unidirectional device 74, which may be similar to diode 22 in that it exhibits high frequency or low enhancement characteristics, and which is preferably a semi-conductor diode, may be added in a series loop with load 32 and poled in opposition to source 76 so that the voltage therefrom tends to bias diode 74 to non-conduction except when the voltage between terminals 38 and 42 exceeds the bias plus the drop therefrom in load 32. This allows for a refinement in the system and more positively prevents a false "1" indication to the load. Diode 74 also prevents circulation of D.C. current from source 76 when the load is not unidirectional.

Unidirectional device 72 may also be similar to diodes 22 and 74 and is poled in opposition to the latter. Diode 72 prevents current from being drawn through winding 14 during the negative excursions of the power pulse source 34. This is not essential but materially decreases operating time as follows: If a current were so drawn, diode 22 would block the positive voltage induced in winding 12 from affecting the input to diode 16. However, upon removal of the negative power pulse voltage the flyback time of transformer 10 would of necessity be great and materially slow the operation of the device since the current would have to flow through the reverse impedance of diode 22, thereby making an excessively long time constant. Also diode 72 tends to increase the input impedance to diode 22 and winding 12 by reflecting its reverse impedance across winding 12, thus further insuring that a major portion of the input is applied to diode 16. Of course the device will still provide a major portion of the input current to diode 16 without diode 72 because of the relative impedance of diode 16 in the forward direction and the inductance of winding 12. It is to be noted that both diodes 72 and 74 are in series with power pulse source 34 and that each are in a series loop with the secondary winding 14 and load 32, although in opposition to each other.

Another transfer circuit which employs the impedance switch of FIGURE 1, is illustrated in FIGURE 4. The transfer circuit of FIGURE 4 differs from that of FIGURE 2 in that there is no effective transfer in the FIGURE 4 circuitry of the complement of an input signal to terminal 26, but rather that effective transfer is a non-complement. That is, upon the introduction of a "1" signal to terminal 26, load 78 receives an output signal which is a "1," and an input signal of "0" produces a "0" output signal to the load. Positive transfer signals from source 34 when flowing upward through resistor 36, have a current value determined by the combination of impedances of secondary winding 14, resistance 36 and load 78. When diode 16 is storing an enhancement charge, the impedance of winding 14 to a current entering it from junction 28 is relatively low, as afore-described. Therefore, the total impedance of load 78 and winding 14 is comparatively low and the current drawn from source 34 is relatively large. On the other hand, if diode 16 is not storing an enhancement charge, the total impedance of winding 14 and load 78 is large so as to cause a relatively small current from source 34. This assumes that the voltage output of source 34 is substantially constant. With the differing currents through load 78, greater and lesser voltages are developed thereacross, the larger voltage occurring with a "1" input signal and the smaller voltage being present with a "0" input signal. The secondary output circuit therefore operates on a voltage divider principle whereby the large impedance of secondary winding 14 allows a comparatively small voltage across load 78 and when the impedance of winding 14 is small, the voltage across the load is relatively larger. The same is true if source 34 provides a substantially constant output current.

As in FIGURE 2, when the impedance of a transformer is relatively high, a signal from source 34 in FIGURE 4 entering the secondary winding 14 from junction 28 provides a reverse current through enhancement diode 16, thereby sweeping out or scavenging at least most of the stored enhancement charge. The operation of the impedance switch is the same as previously described, with each signal from source 34 occurring after the times allotted to "0" and "1" input signals.

The signals from source 34 are again preferably alternating signals of a square wave type such as those shown in line A of FIGURE 3. However, they may as well be unidirectional pulses especially when load 78 or the remainder of the secondary output series loop does not have unidirectional characteristics. Preferably, however, load 78 does have such characteristics, or a unidirectional device may be placed in the series output circuit so as to allow pulses from source 34 to flow only upward through resistor 36. Unidirectional characteristics in the output circuit, whether due to a diode in the circuit, unidirectional characteristics of the load itself, or unidirectional pulses from source 34, tend to prevent any currents induced in the secondary winding from flowing in the circuit. Use of alternating square wave pulses from source 34 is not objectionable, however, even though there is no unidirectional characteristic in the output circuit. This is true since the load will never receive a full negative pulse of current in any negative excursion of the square wave. Diode 22 blocks flow of induced current in primary winding 12 of any negative pulse from source 34 at all times and the impedance reflected therefrom in the secondary winding is always high to negative pulses so as to cause any negative current to the load to be insubstantial. The reverse impedance condition of enhancement diode 16 is immaterial as to the negative pulses from source 34 since a preceding positive pulse has always at least substantially removed the enhancement charge if any. Therefore, if the load itself does not substantially increase the impedance to negative pulses, their presence is not necessarily detrimental to the operation of the circuit of FIGURE 4.

As in FIGURE 2, the transfer pulses from source 34 may be power pulses which cause the transfer circuit to exhibit an amplification characteristic. This again is an important feature of the arrangement in FIGURE 4, which in such case provides a non-complementing type amplifier of the diode variety. The waveforms shown in FIGURE 3 can also be applied to the operation of the embodiment of FIGURE 4, with it being understood that since load 78 is in series with the secondary winding 14, the relatively large voltage pulses such as pulse 68 in line F are not also across the load, but that "1" pulses occur across the load in a non-complementing sense when the voltage across the secondary winding is relatively low.

Load 78 of FIGURE 4 must be able to distinguish between the two current amplitudes to allow two operating states to be defined. This is similar to the situation for FIGURE 2 wherein the solution, if not inherent in the load 32, is obtained by use of the threshold voltage source 76. No counterpart is presently described for FIGURE 4, but means for providing a current delay or threshold for a series circuit such as FIGURE 4 will be described later in reference to FIGURE 9.

The shape of the diode reverse-current transient after its maximum value is reached often resembles an exponential curve until approximately 0.8 of the total enhancement charge is removed after which the current transient (enhancement current) subsides very slowly almost asymptotically, as is fully explained in said copending application of G. I. Williams and as is roughly depicted by pulse 58 in line D of FIGURE 3.

In a complementing amplifier like that illustrated in FIGURE 2, if the enhancement charge is not completely removed during the first power pulse following an input pulse, the transformer will reflect low impedance, for a time at least, to the next, i.e., second, positive power pulse assuming no input to the enhancement diode between the first and second positive power pulses. Therefore, some of the second power pulse (at least) will be diverted from load 32 through the secondary winding 14, thereby decreasing the output to the load. That is, if the enhancement charge is not completely removed by the first positive power pulse, and there is no input during the negative pulse or zero portion following the first power pulse, the output pulse to the load will be of comparatively small amplitude during its initial portion, if not during the whole time occurrence of such pulse. In other words, if the second power pulse effects complete sweep of the enhancement charge from the diode, but the first power pulse does not, a sort of "front porch" may be formed on the second output pulse. Additionally, if the second power pulse is insufficient to remove the enhancement charge completely, the third pulse may be similarly effected, and the same will occur for the fourth positive power pulse, etc., until full sweep of the enhancement charge is effected. Therefore, it is apparent that if complete removal of the charge is not accomplished by the first positive power pulse, the following output pulses may be affected so that the load will not receive a full "1" complementary pulse but a "marginal" "1" pulse.

With a non-complementing type amplifier such as that illustrated in FIGURE 4, "sneak" or "zero" pulses may occur in the output if the enhancement charge is not completely removed by the first power pulse following an input pulse to the enhancement diode. That is, assuming no input pulse between the first and second power pulse, the load 78 will receive a slightly larger current pulse from the second power pulse if completely removal of the enhancement charge is not effected by the first power pulse. Such a slightly larger output pulse to the load may be even large enough to indicate falsely a "1" to the load. Such a false indication may be termed a sneak pulse, which, of course, is undesirable. In other words, in both cases it is highly desirable to completely remove the enhancement charge during the first positive power pulse following an input signal to the enhancement diode.

On the other hand, if the enhancement charge is essentially removed too soon, i.e., before the end of the first positive power pulse following the storage of a charge in the enhancement diode of a non-complementing type amplifier, the impedance in the transformer windings will rise rapidly so as to stop conduction of the power pulse through winding 14 prematurely. That is, the output "1" pulse to the load will be cut short so as to effect a sort of "back porch" on the output pulse. However, assuming no further input to the enhancement diode before the second positive power pulse, the output to the load remains small to indicate a "0" during the second power pulse. Therefore, it is immaterial as to succeeding outputs if the first output pulse is cut short, as long as such first pulse is sufficient to indicate a "1."

With a complementing type amplifier similar to that shown in FIGURE 2, the situation is different, however, if the stored charge is essentially removed before the end of the first positive power pulse following an input pulse to the enhancement diode. Again, the premature removal of the charge will cause a rapid rise in the impedance of the transformer windings, but in this case, a "sneak" pulse will be presented to load 32, thereby falsely indicating a "1."

From the foregoing four paragraphs, it is apparent that in either type of amplifier, it is desirable to remove all enhancement charge during the application of the first positive power pulse following the storage of such a charge so that the output pulse or pulses from a complementing amplifier will not be affected, and so sneak pulses will not occur from the non-complementing type. However, it is difficult to make the timing always exact, and if complete removal is accomplished, it is likely that removal will be too soon. As before noted, removal too early will cause a sneak pulse to the load in a complementing type amplifier, but early removal is immaterial in a non-complementing type. This coupled with the fact that incomplete removal in a non-complementing type will not likely produce an output pulse sufficiently indicative of a "1" falsely, indicates that a complementing amplifier is much more likely to exhibit a sneak pulse output than will the non-complementing type. Thus the input and reverse currents along with the circuit constants relative to each other should be controlled. The alternative is to operate diode 16 under conditions of enhancement saturation. This would result, however, in a power level too high to be practical in the present state of the art and the lowering of the charge gain in the diode. It has been discovered that the enhancement characteristics of silicon crystal diodes are more adaptable to this invention than are germanium crystal diodes because the wave shape of silicon crystal enhancement or reverse current is more peaked than that for germanium crystals.

Another consideration of the diode-transformer amplifiers of either type, is that the reverse breakdown voltage of enhancement diode 16 must be sufficient to withstand the high back voltages which are present in the system, as previously indicated. FIGURE 3 illustrates large negative excursions in line E at times 1—2 and 7—8 which occur after an insubstantial current input (0) to the enhancement diode. These voltages are caused by the corresponding positive power pulses in line A generating substantial voltage pulses as shown in line F across winding 14, although current at that time in the winding is negligible. The resultant induced negative voltage pulses across primary winding 12 as shown in line E are much larger than the corresponding secondary pulses in line F when the primary winding has more turns than the secondary winding. These large pulses appear across the primary winding in a direction such that they tend to pass through the enhancement diode in a reverse direction. If the enhancement diode 16 has not stored an enhancement charge, the reverse voltage across the diode will tend to break down the diode unless the diode can withstand the reverse voltage. Enhancement diodes are currently available which will withstand such large back voltages without breaking down.

FIGURE 5 illustrates an alternate embodiment of this invention wherein multiple input windings 12 and 12$a$ may be wound on the core of a single transformer 10′ along with multiple output windings 14 and 14$a$, whereby a plurality of outputs may be obtained from one of a plurality of different inputs to such an impedance switch. The connection to primary winding 12$a$ is the same as that to primary winding 12 in that there is connected an enhancement diode 16′ in parallel with winding 12$a$ and a unidirectional current conducting device 22′ in between the enhancement diode and primary winding and in series therewith. The operation of the impedance switch is similar to that described for FIGURE 1 except that inputs to either of terminals 26 or 26′ changes the impedance of transformer 10′ so as to reflect same to the output terminals 28, 30 and 28′, 30′. That is, when a "1" input signal is presented to either or both of terminals 26, 26′ an enhancement charge is thereby stored in the corresponding enhancement diode to reduce the reverse impedance thereof so that the impedance of each of the secondary windings is relatively low, appearing almost as a short circuit to positive signals at either of terminals 28 or 28′.

It is also possible to employ the second primary winding 12$a$ of FIGURE 5 and its associated input circuitry with the impedance switch of FIGURE 1 because the secondary circuit thereof is independent of the average potential of the secondary winding. Of course, any number of secondary windings may be employed with a single transformer, and each of the secondary windings may be connected to an output circuit to form an OR circuit of either the complementing or non-complementing type in accordance with the embodiments of FIGURES 2 and 4. An OR circuit results since input signals to either of the input terminals 26, 26′ of FIGURE 5 will provide an output signal. Of course, amplification characteristics may be given to the circuit in the manner previously described.

One of the presently most advantageous output circuit configurations of the invention is included in the circuit of FIGURE 6 as the output circuit of impedance switch 100. Since the output circuit in which the variable impedance switch 100 acts is independent of the average potential of the secondary winding 14, it is possible to connect winding 14 to more than one load in series such as to other similar diode-transformer impedance switches. It follows that if such a combination is used as an amplifier, the inputs to a number of such amplifiers may be connected in series, forming the multiple outputs of another similar amplifier. Thus, a number of outputs would require no more current than one, since the gain would be dependent on output voltage rather than current. FIGURE 6 illustrates such a diode amplifier circuit using this means of obtaining multiple outputs. The circuitry of FIGURE 6 may also be thought of as comprising mere transfer circuits which do not necessarily have amplification properties.

The load in the output circuit of switch 100 in FIGURE 6 comprises two impedance switches 102 and 104 of the type shown in FIGURE 1, with their primary circuits connected in series and across output winding 14. Also connected in series with the primary circuits of switches 102 and 104, in opposition to enhancement diodes 106 and 108, is a source 110 providing a voltage V with a low impedance characteristic. Transfer signals are again provided by source 34 through resistor 36 to junction 38, from which they either go through diode 72 to secondary winding 14, or go directly to enhancement diodes 106, 108 without passing through any unidirectional current conducting device between junctions 38 and 112, such as diode 74 in FIGURE 2. Instead, that diode is replaced, in FIGURE 6, by diode 74′. In comparing the location of diode 74′ with its counterpart 74 in FIGURE 2, it will be noted that the diode is in an alternate position such that it is between junction 38 and the source 34. This is a preferred location for the diode since thereby, full drain of the stored minority carriers or enhancement charges is allowed. That is, while no "1" output signal is present at junction 112 from source 34 to cause an enhancement charge to be stored in diodes 106 and 108, but after such a pulse has been present, the positive current from voltage source 110 (along with currents from switches 102 and 104 as caused by sources 114 and 126, respectively as is later explained) provides a reverse current through enhancement diodes 106 and 108 to scavenge the enhancement charge. Battery 110 alone only tends to sweep out diodes 106 and 108 since it provides only a relatively small and constant current thereto and to diode 72, i.e., the current flows from junction 112 through diode 72 and secondary winding 14. Since the battery current is relatively constant, it is not passed to the transformer primary of switch 100 and any enhancement charge in diode 16 is not affected thereby. Since source 110 constantly provides an output current which effectively opposes any "1" input signal to enhancement diodes 106 and 108, the effect of such "1" signals is slightly less than would be otherwise. However, the advantage of assisting the removal of a charge from the enhancement diodes outweighs such a relatively small disadvantage.

The output circuit of impedance switch 104 in FIGURE 6 is arranged exactly like that in FIGURE 2. However, source 114 provides positive pulses through resistor 116 in between the time when the pulses from source 34 are positive. That is, if the pulses from sources 34 and 114 are alternating, a positive pulse occurs from source 114 during the occurrence of a negative pulse from source 34 and vice versa. In this manner, load 118 receives an output signal at the same time as input signals are provided to enhancement diode 16. The output circuits connected to impedance switches 100 and 104 are similar except for the locations of the corresponding diodes 74' and 120, but it is to be understood that either may be disposed in either of the alternate locations. Both output circuits, regardless of the disposition of diodes 74' and 120, provide complementing outputs to their respective loads.

The sequence of events of operation of the two circuits including switches 100 and 104 is such that following a "0" input signal to diode 16, a positive transfer pulse from source 34 provides a "1" output pulse to diodes 106 and 108, thereby storing an enhancement charge therein. During the following period of time, not only is another input to enhancement diodes scheduled, but also a positive output from source 114 occurs. Since enhancement diode 108 has decreased the impedance of switch 104, load 118 receives a "0" signal. Therefore, it is seen that the two complementing pulse transfer circuits including respectively impedance switches 100 and 104 provide a non-complementing output to load 118. Had the original "0" input to diode 16 been a "1," no enhancement charge would have been stored in diode 108, and load 118 would therefore have received a "1" output signal.

The output circuit connected to impedance switch 102 illustrates the manner in which two loads may be connected in parallel to the output of one secondary winding of an impedance switch. When using this arrangement, the circuits including loads 122 and 124 preferably should have unidirectional current conducting characteristics such that current may flow only downward therethrough, to prevent current from source 110 from flowing constantly through these loads and the output winding of impedance switch 102. As in the case of the loads for the output winding of impedance switch 100, loads 122 and 124 may be other impedance switches having enhancement diodes or the like. So as to cause successive transfer of the input to enhancement diode 16, from the output of impedance switch 100 to the output of impedance switch 102, transfer signal source 126 is phased so that positive signals therefrom occur at the same time as those described as issuing from source 114. That is, they alternate in their positive excursions with the signals from source 34 so as to be 180° out of phase therewith, thereby providing a two phase driving system. Diodes 128 and 130 are shown in the alternate location the same as diode 74' but it is to be understood that both diodes 128 and 130 may be disposed in the same relative position as diode 120. Of course, source 126 may provide sufficient power to cause amplification of the input signals; this is also true for sources 34 and 114, all as previously indicated. The output signals to loads 122 and 124 are complements with respect to the input signals to enhancement diodes 106 and 108 but are non-complements as to the input signals to enhancement diode 16.

The number of parallel loads which may be connected to a single secondary winding of an impedance switch, e.g., switch 102, is limited, depending on the load characteristics, by the enhancement capabilities of the diode associated with the switch. That is the allowable number of loads 122, 124, etc., is related to the ability of diode 106 to store minority carriers. However, when the loads are in series, as are the loads including enhancement diodes 106 and 108 relative to output winding 14, the ability of the "driving" enhancement diode (16, for example) to store minority carriers does not particularly limit the number of series loads which may be connected to the secondary winding 14 since the same current is used to drive each such load.

Figure 7:
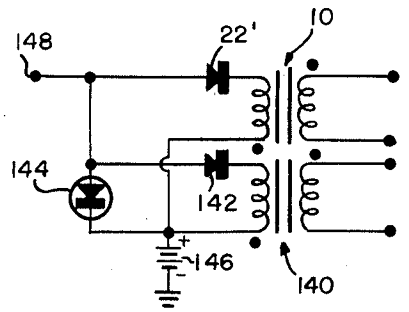
FIGURE 7 illustrates another embodiment of an impedance swich whereby parallel outputs may be obtained with the use of a single enhancement diode with multiple transformers.

FIGURE 7 illustrates an alternate embodiment for providing parallel outputs from one enhancement diode. In the impedance switch of FIGURE 7, two separate transformers 10 and 140, each with single primary and secondary windings, and their respective isolation diodes 22' and 142 are coupled in parallel at their input circuit with a single enhancement diode 144. A source 146 of voltage is connected in series with the enhancement diode mainly to provide a voltage threshold for "1" input signals and secondarily to cause a reverse current through the diode when no "1" input signal is present at terminal 148. As before mentioned, such a source of potential drains the excess enhancement charge not removed by other means. In this embodiment, the number of transformers which may be used is strictly limited by the ability of enhancement diode 144 to store minority carriers. Since there is no mutual inductance between the different transformers 10 and 140, separate outputs may be obtained from the different secondary windings of the two transformers, all in response to a single input signal. The output circuit for the secondary windings may be either of the complementing type illustrated in FIGURE 2, or the non-complementing type of FIGURE 4. Operation of the impedance switch and associated output circuitry may be as previously described. Another method of obtaining multiple outputs from a single input is that a plurality of secondary windings may be employed with a single transformer having one primary winding and an associated enhancement diode.

Figure 8:
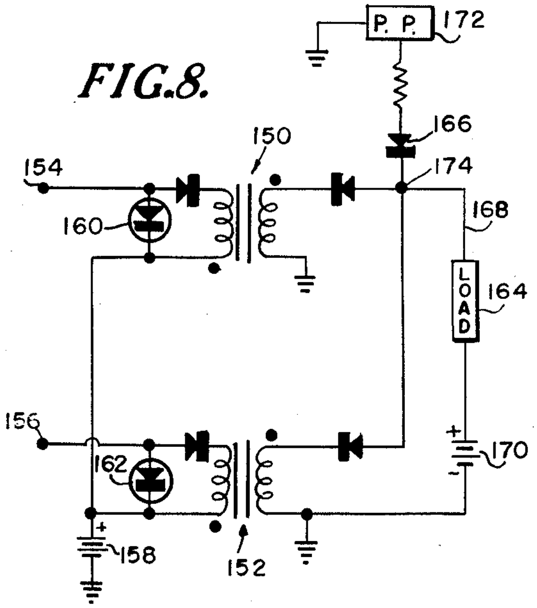
FIGURE 8 illustrates a logical AND circuit.

FIGURE 8 illustrates a technique for employing a number of impedance switches with a single output circuit to form a logical AND circuit. The inputs to the two impedance switches 150 and 152 are via terminals 154 and 156 respectively, the primary circuit of each of the impedance switches being otherwise connected to ground through a source 158 of voltage which, as previously described, provides an input threshold level and helps scavenge the enhancement charge stored in the enhancement diodes 160 and 162. The secondary windings of impedance switches 150 and 152 are coupled in parallel with each other and in parallel with load 164. Diode 166 is illustrated in its alternate location, but could as well be disposed in line 168. When it is not in line 168, load 164 preferably has unidirectional characteristics so that current from voltage source 170 is precluded from appearing in the secondary windings of impedance switches 150 and 152. Positive transfer pulses are obtained from source 172 and are preferably, but not necessarily, alternating square waves. Each of the output circuits for the different impedance switches provides a complementing type output signal. However, if either of the secondary windings of switches 150 and 152 presents a low or insubstantial impedance, current issuing from source 172 will flow through the low impedance winding in the manner described in relation to FIGURE 2, thereby keeping junction 174 less positive than the bias supply voltage from source 170. This means that load 164 receives a "1" output signal only when both of the input terminals 154, 156 are supplied with "0" input signals. The whole circuit of FIGURE 8, therefore, forms a complementing logical AND function. If the transfer pulse signal source 172 were located in line 168, it is apparent that the circuit would then form an OR circuit (non-complementing like FIGURE 4). If the transfer pulses from source 172, in either of its possible loactions, are power pulses, attendant amplification characteristics may be noted in the circuit.

Figure 9:
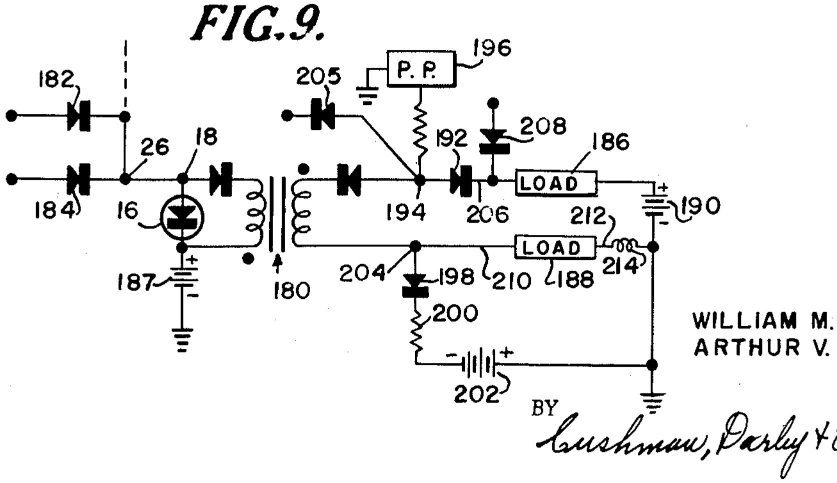
FIGURE 9 illustrates a transfer circuit employing multiple inputs with complement and non-complement outputs.

FIGURE 9 illustrates still another embodiment of the invention. To the input terminal 26 of impedance switch 180, there may be connected a number of different inputs such as those that might be provided by circuits (not shown) connected in their output through diodes 182 and 184. The input circuit to impedance switch 180 is, therefore, forming a logical OR configuration. That is, a substantial current through one of diodes 182, 184, provides a like current through enhancement diode 16 so that the impedance switch is operative in accordance with any one of the inputs thereto. If negligible or no currents flow in all of the input circuits to terminal 26, then an insubstantial current flows in the enhancement diode. The problem of having a number of negligible "0" input signals from each of a number of OR input diodes, including diodes 182 and 184, connected to terminal 26, thereby providing a sufficient forward current in enhancement diode 16 to allow a transfer when the impedance switch 180 feeds into a complementing type output circuit, can be eliminated to a large degree by providing a current delay system in the form of a voltage threshold. That is, load 186 when in the output circuit of switch 180 in a complementing sense as is the case depicted, is likely to receive "front porch" type or marginal "1" output signals if there is no compensation for the situation when all the input signals to terminal 26 are "0." To obviate this problem, voltage source 187 is provided in series opposition with enhancement diode 16. This source not only operates to remove any remaining enhancement charge, but opposes the "0" signals to terminal 26, individually and as a whole. Therefore, unless all the "0" input signals cause a forward current in enhancement diode 16 larger than that due to the opposing bias of source 187, no enhancement charge will be stored.

The output circuit which includes load 188 will be referred to presently, but in the meantime it may be again noted that the output circuit associated with load 186 is of the complementing type similar to that of FIGURE 2 with a voltage threshold being provided by source 190 to cause current delay so that false indications of "1" output signals are prevented and the front porch of any marginal "1" output signal may also be substantially eliminated as later described. Diode 192 is disposed in between junction 194 and load 186, but could also be located between junction 194 and the transfer pulse source 196, as before explained, especially if the load circuit otherwise has unidirectional characteristics which oppose current flow from source 190.

The output of impedance switch 180 in FIGURE 9 provides both complement and non-complement signals by embodying both the configurations of FIGURE 2 and FIGURE 4. Load 188 is connected in the non-complementing output circuit, and consequently, receives a "1" when a "1" input signal is present at terminal 26. When all of the input signals during a given input time period are "0," load 188 receives a "0" output signal.

The problem above mentioned of the total "0" input signals to terminal 26 in FIGURE 9 during a given time period causing storage of some enhancement charge and thereby providing in this case a false rather than a marginal "1" input to load 188, if not sufficiently overcome by voltage threshold 187, may be additionally compensated for by the current delay system including unidirectional device 198, resistor 200 and voltage source 202. Basically, all that is necessary is source 202 to provide a threshold so that false "1" output signals tending to pass junction 204 to the load 188 will be diverted from the load. However, in carrying out this function, the use of impedance means in series with source 202 is more practical. Such impedance means may comprise resistor 200 and can include diode 198 if desired. In operation, current from the secondary winding of impedance switch 180 is diverted through the impedance means until the voltage thereacross is equal to the voltage of source 202, after which time the current then may proceed to load 188.

It may be noted that the circuit of FIGURE 9 does not require the usual resistor-bias-voltage circuit at its input terminal 26 in the manner normally associated with a diode OR circuit. Any positive residual electric charge on the stray capacity from junction 18 to ground due to prior positive inputs to terminal 26 is drained through enhancement diode 16. Since the capacity to ground of junction 18 is normally small, the reverse current resulting therefrom is usually negligible. Any negative electric charge on such stray capacity is dissipated during the input phase when a connected OR circuit driving pulse goes positive and causes a "1" or "0" transfer, thereby quickly raising the stray capacitive potential at junction 18 to at least the ground reference plus the small output drop across the output windings (not shown) connected to the diodes 182, 184 of the logical OR circuit during a "0" transfer, and to the voltage of source 187 during a "1" transfer. If a resistive-voltage network is added to the input logical OR circuit, for example at junction 18, such added network would load the enhancement diode 16 during the time the reverse current is flowing, thereby diverting some of the reverse current from diode 12 and reducing maximum current gain of the impedance switch and associated output circuit. Compensating to the above adverse effect on circuit operation at least to some extent, such a network, when added, provides in combination with bias source 187 a constant reverse voltage on enhancement diode 16, which as before mentioned, tends to sweep the minority carriers or enhancement charge from said diode.

Additional logical functions may be added to the circuit configuration of FIGURE 9. For example, a logical AND circuit will result when diode 205 is coupled to junction 194, or an OR circuit may be formed on line 206 in a manner similar to the way diodes 182 and 184 form a logical OR configuration, such as by coupling diode 208 to line 206. In a similar manner a logical OR circuit may be formed by coupling one or more diodes to line 210. In addition, a negating function may be added to the circuit of FIGURE 9 by inserting in line 212 an output winding 214 of another (not shown) transfer circuit or diode amplifier. The latter logical function affects the input to both loads 186 and 188, and therefore, the complete logical consequence to both loads should be investigated on each application.

The frequency response of the circuits heretofore described is limited almost entirely by the ability of any one of the circuits to clear any then stored carriers or enhancement charge during one timing cycle without a substantial rise of the diode impedance before the end of the transfer or power pulse. Removal of the undesired remaining charge in the enhancement diode can be accomplished by providing a negative voltage at the anode terminal thereof to cause a scavenging reverse current through the enhancement diode whenever a positive transfer signal is absent. Thus, the input circuit could provide either an additional enhancement charge or scavenge the enhancement residue before each input signal. That is, when a scavenging voltage source is placed in series opposition with an enhancement diode, and when this diode is in an output circuit so as to be charged by positive going excursions of a transfer pulse source coupled to the anode terminal of the enhancement diode without any high frequency diode opposing the current flow of the scavenging voltage source, the transfer pulses may be made to go negative on alternate half-cycles to cause a reverse current through the enhancement diode from the scavenging voltage source and thereby remove the excess enhancement residue in the enhancement diode. Several of the embodiments described in this application have such a feature, but it may best be seen in FIGURE 6.

With reference to FIGURE 6 again, enhancement diodes 106 and 108 are scavenged as follows by the alternating transfer pulses from source 34. When no substantial signal is provided to the input terminals of impedance switch 100, the potential at junction 38 remains less than voltage +V of source 110, and the enhancement residue in diodes 106 and 108 may flow through secondary winding 14 of impedance switch 100, rather than being blocked by any diode in the series loop including source 110, enhancement diodes 108, 106, and winding 14. Thus, bias voltage V from source 110 may provide the reverse potential across the enhancement diodes which sweeps the minority carrier residue therefrom.

It is possible with a complementing transfer circuit such as any one of those shown in FIGURES 2, 6, 8 and 9, to set the bias voltage connected to the load such that the first output pulse following one or more zero outputs is not noticeably distorted, i.e., not a front porch type or low amplitude marginal "1." However, the best signal-to-noise ratio is obtained when this voltage is such that the amplitude of the first output pulse of a stream of pulses, is slightly smaller than succeeding pulses, though sufficient to indicate a "1." If the load bias voltage is high, smaller input forward current is allowed through the enhancement diode, resulting in less enhancement current and larger sneak pulses. However, a next similar stage will be relatively insensitive to the larger sneak pulse because of the higher bias. On the other hand, a low bias will result in a larger enhancement charge, insufficient residual charge scavenging and a small "1" output. In this case, the next stage will not be affected by the substandard input because of the lower bias. This self-adjusting feature reduces the critical nature of the circuit parameters to a point which is practical. This self-limiting feature of the complementing transfer circuit works adversely in the case of a non-complementing transfer circuit (for example FIGURE 4) but because of the absence of sneak pulses in the latter configuration, it is not a problem.

Figure 10:
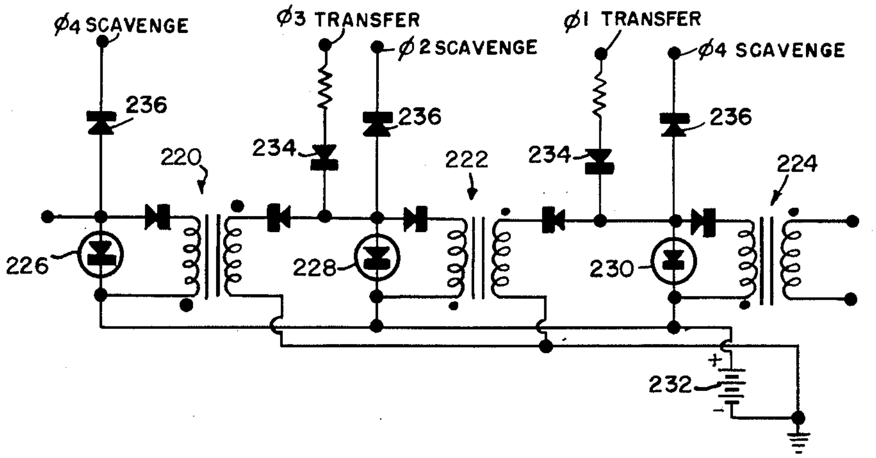
FIGURE 10 illustrates a shifting register or cascaded complementary amplifier.
Figure 11:
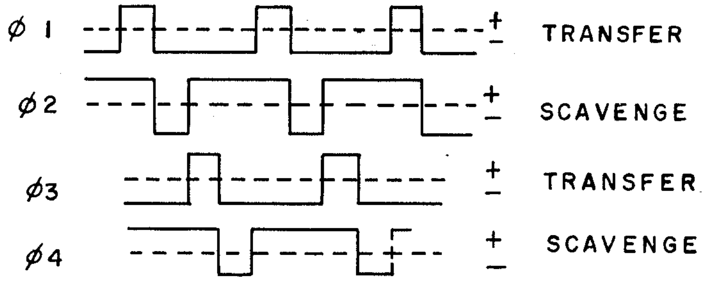
FIGURE 11 is a set of drive waveforms usable with the circuit shown in FIGURE 10.

The preferred scheme of removing residual minority carriers includes forced scavenging of the residual enhancement charge and involves the use of a multi-phase transfer pulse source such as is normally available by clock pulses in given apparatus. FIGURE 10 illustrates forced scavenging by a four-phase clock for a circuit which may be described as a shifting register, or cascaded complementing amplifier assuming sufficient power in the transfer pulses for amplification. An exemplary four-phase timing system for use with the circuitry of FIGURE 10, is shown in FIGURE 11 wherein phases one ($\phi1$) and three ($\phi3$) are the transfer or power clock pulses which move between negative and positive values relative to zero voltage so as to form positive going pulses at different times, and wherein phases two ($\phi2$) and four ($\phi4$) are negative going pulses moving between positive and negative values relative to zero voltage at differing times and respectively in between the pulses of phases one and three. The negative going pulses of $\phi2$ and $\phi4$ provide the scavenging action at the proper times in the circuitry of FIGURE 10, as will be more apparent hereinafter.

In FIGURE 10 impedance switches 220, 222 and 224 are similar to the impedance switches heretofore described, having enhancement diodes 226, 228 and 230 respectively, connected in parallel to voltage scource 232. Transfer pulses of $\phi1$ and $\phi3$ are coupled respectively to the secondary windings of impedance switches 222 and 220 in a manner similar to that heretofore described, with the coupling diodes 234 being between the transfer pulse source and a corresponding secondary winding. For scavenging purposes, the negative going pulses of $\phi2$ and $\phi4$ are coupled respectively through diodes 236 to alternate ones of the enhancement diodes at their anode terminal. That is, scavenging pulses of phase two are coupled to the anode terminal of enhancement diode 228, while scavenging pulses of phase four are coupled to the anode terminals of enhancement diodes 226 and 230.

The pulsed scavenging of residual minority carriers in the enhancement diodes is accomplished through isolation diodes 236. During the period of non-scavenging, i.e. transfer period, the $\phi2$ and $\phi4$ signals are sufficiently positive to make diodes 236 non-conductive, thereby preventing the scavenging pulses from affecting the transfer signals during transfer periods. During the scavenging period, $\phi2$ and $\phi4$ pulses are sufficiently negative to cause all remaining minority carriers to be swept out of the enhancement diodes by positive current from voltage source 232 passing through the enhancement diodes and through diodes 236 to the scavenging pulse sources. This pulsed scavenging system is very desirable in the operation of transfer circuits, particularly those with amplification properties, and it is to be understood that this system may be added to each of the foregoing described embodiments.

In operation, the pulsed scavenging of FIGURE 10 is applied in the phase period just prior to the input phase. For example, in impedance switch 222, enhancement diode 228 is cleared of minority carriers during $\phi2$, while the transferred input thereto from switch 220 occurs during $\phi3$. The output from switch 222 is transferred to switch 224 during the following $\phi1$ pulse. Similarly, for impedance switches 220 and 224, scavenging occurs during $\phi4$ pulses, while inputs and outputs thereto are during $\phi1$ and $\phi3$ pulses, respectively.

Figure 13:
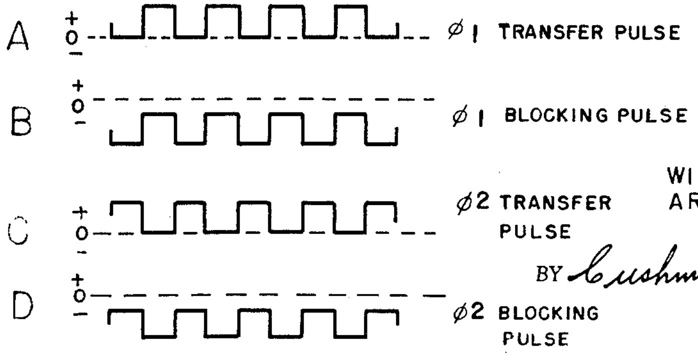
FIGURE 13 is a set of waveforms usable with the circuit of FIGURE 12.
Figure 12:
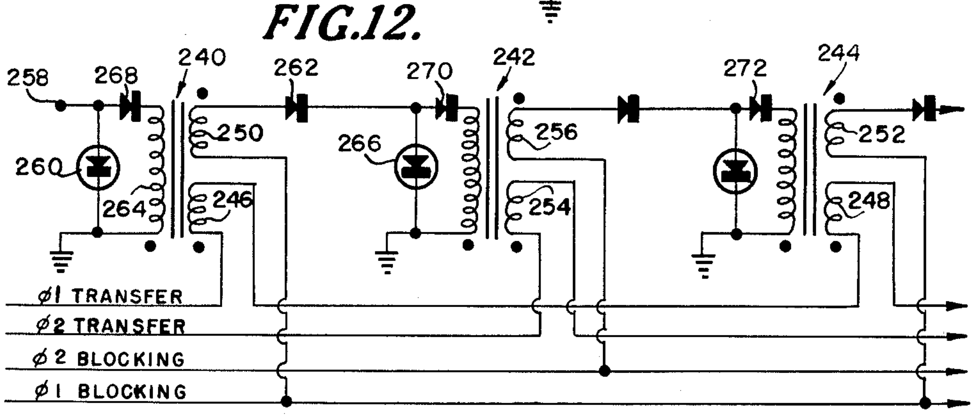
FIGURE 12 illustrates a complementary type shifting register.

Reference is now made to FIGURE 12 which illustrates another type of shifting register that may be constructed in accordance with this invention. This embodiment like all the preceding embodiments requires a multi-phase timing system, exemplary waveforms of which are shown in FIGURE 13. But it is to be noted that only two phases are needed, rather than the four phases for the circuitry of FIGURE 10. However, during each phase, two different pulses are employed. As will be noted by reference to FIGURE 13, the phase one transfer pulses of line A and the phase one blocking pulses of line B, are similar in time and shape, but have different D.C. reference values. That is, (the $\phi1$ transfer pulses of line A when most negative have a zero voltage value and extend positive during phase one periods. However, the $\phi1$ blocking pulses of line B, although most positive during a phase one period, are still somewhat negative at that time, and extend in a negative direction during the phase two periods. The transfer and blocking pulses of phase two (lines C and D of FIGURE 13) are exactly like the corresponding pulses of phase one, but are 180° out of phase therewith. That is, when the phase one pulses are most positive, the phase two pulses are most negative, and vice versa.

With reference again to the shifting register of FIGURE 12, it may be noted that impedance switches 240, 242 and 244 are each similar to the impedance switches heretofore described except that each has two secondary windings. The primary and secondary windings of each impedance switch may be disposed thereon relative to each other in the manner illustrated by the dots at one end of each of the windings. $\phi1$ transfer pulses are serially connected to secondary windings 246 and 248 which appear on alternate impedance switches 240 and 244. In a similar manner, but in parallel, $\phi1$ blocking pulses are coupled to the other secondary windings 250, 252 of these two switches. In like manner, transfer and blocking pulses of phase two are coupled to secondary windings 254 and 256 respectively of impedance switch 242, and to other alternate switches not shown.

Since transfer pulses across winding 246 occur during phase one, the binary input at terminal 258 for enhancement diode 260 occurs during a phase two period. Assuming a "1" input to terminal 258, a succeeding $\phi 1$ transfer pulse causes an enhancement current from diode 260 which is thereby returned to its higher reverse impedance value. The occurrence of the $\phi 1$ transfer pulse, by transformer action, also tends to induce a voltage in winding 250 which tends to make diode 262 conductive, but such voltage is limited by the then low impedance of switch 240. Also, during the positive excursion of the transfer pulse, the $\phi 1$ blocking pulse is slightly negative, and this prevents any conduction through diode 262. Therefore, it becomes apparent that the shifting register of FIGURE 12 is of the complementary type.

When there is a "0" input to terminal 258 in FIGURE 12, there is but little if any enhancement current provided from diode 260 upon occurrence of a $\phi 1$ transfer pulse. However, the transfer pulse applied to winding 246 provides a substantial voltage therein which by transformer action is also induced in primary winding 264 and secondary winding 250. This substantial voltage induced in winding 250 is added to the positive excursion level of the $\phi 1$ blocking pulse, thereby providing a sufficiently positive potential on the anode of diode 262 and causing a substantial current flow therethrough to enhancement diode 266 of the next succeeding impedance switch 242. The operation for transfer from impedance switches 242 to 244, etc., is similar. It is apparent from the foregoing that the circuitry of FIGURE 12 provides a complementary type shifting register.

When a transfer circuit including any one of the impedance switches of FIGURE 12 is in its output phase, and there is negligible or no enhancement current from its enhancement diode, there appears a large negative potential at the cathode terminal of the associated diodes 268, 270 or 272. That is, with reference to impedance switch 242, during a $\phi 2$ transfer pulse to winding 254 when diode 266 has no stored enhancement charge, the voltage at the cathode of diode 270 is negative and large because the primary circuit of switch 242 effects a high impedance to the transfer pulse. In order to prevent this negative potential from appearing at winding 250 of the preceding impedance switch 240 through diodes 270 and 262, the negative excursions of the $\phi 1$ blocking pulses assume a more negative potential than the voltage induced in the primary winding of switch 242, thereby preventing current from flowing through the loop comprising winding 250, which if allowed, in turn, would apply a negative voltage to the cathode of diode 268 and undesirably divert part of any then existing input to terminal 258 from enhancement diode 260.

Voltage applied to winding 264 from the output circuit of switch 240 during the input phase of switch 242 could introduce false information into the system by erroneously modifying the output signal of switch 240, but this is prevented as will be apparent from the following. During a "1" input to terminal 258, the $\phi 1$ transfer and blocking pulses are both on negative excursions, but in opposing windings 246 and 250 respectively. Therefore, the induced voltages cancel, thus not inducing any undesired E.M.F.'s in winding 264. For greater reliability, if desired, the voltage excursions of the transfer pulses can be made greater than that of the blocking pulses, thereby providing a slightly more positively voltage on the cathodes of diodes 268, 270 and 272.

In the shifting register circuitry of FIGURE 12, one binary digit may be contained in two interconnected impedance switches, which may be referred to together as a register digit position. For example, the interconnected impedance switches 240 and 242 may be considered such a one digit position. With binary information introduced at terminal 258 during the timing phase arbitrarily designated $\phi 2$, such information is transferred during the $\phi 2$ period to the next register digit position, the left half of which is illustrated generally along with the impedance switch 244. This embodiment may be termed a "dynamic" register as opposed to a "static" register in that the electrical current embodiments representing the binary information are continuously circulated from one transfer circuit to another before the enhancement current of a charged enhancement diode subsides.

Thus it is apparent that there is provided by this invention circuits in which the various aspects, objects and advantages herein set forth are successfully achieved.

Modifications of this invention not described herein will become apparent to those of ordinary skill in the art after reading this disclosure. For example, one modification which may be made is the placement of a battery between the cathode of any of the enhancement diodes herein, while keeping one terminal of the primary winding of the impedance switch at ground reference potential. It is intended, therefore, that the matter contained in the foregoing description and the accompanying drawings be interpreted as illustrative and not limitative, the scope of the invention being defined in the appended claims.

What is claimed is:

1. An impedance switch comprising:

one transformer having one primary winding and one secondary winding, said transformer having and operating on the slope of a substantially sloping characteristic curve which exhibits the transformer characteristic of substantially no residual flux;

a semiconductor body exhibiting substantial enhancement properties coupled in parallel with said primary winding;

a unidirectional current conducting device exhibiting negligible enhancement properties coupled in series opposition between the primary winding and said body, having one of its two electrodes coupled to a like electrode of said body, and having a second electrode coupled to said primary winding;

and means for coupling a binary forward current through said body to cause relatively large or substantially no enhancement charge in said body for making the effective impedance of said transformer relatively low or relatively high.

2. An impedance switch comprising:

one transformer having one primary winding, said transformer having, and being operated on the slope of a substantially sloping characteristic curve which exhibits the transformer property of substantially no residual flux;

a semiconductive body having a pair of dissimilar electrodes and a unidirectional current conducting device having a set of electrodes different from one another, said pair and said set being substantially similar to each other, said semiconductive body exhibiting substantial enhancement property being coupled in parallel with said primary winding, and said unidirectional current conducting device being coupled in series opposition between said primary winding and said body;

means for coupling predetermined like electrodes of said semiconductive body and said unidirectional current conducting device together such that said primary winding is intermediate the remaining like electrodes;

means for coupling a binary forward current through said body to cause relative large or substantially no enhancement charge in said body for making the effective impedance of said transformer relatively low or relatively high respectively;

and means for scavenging said enhancement charge from said body at a time after termination of said binary forward current which caused said charge, thereby restoring said body to an original condition of substantially high back-impedance.

3. An impedance switch comprising:

one transformer having one primary winding, and one secondary winding, said transformer having and operative on the slope of a substantially sloping characteristic curve which exhibits the transformer characteristic of substantially no residual flux;

a semiconductive body characterized by enhancement charge storage capabilities effected in response to the application of a forward current, said stored charge thereby producing a relatively low back-impedance for a period of dissipation of said charge after said forward current is terminated, and a high back-impedance in the absence of application of said forward current, said body having a pair of dissimilar electrodes, one of which is coupled to a terminal of said primary winding;

a unidirectional current conducting device having a set of at least two dissimilar electrodes which are similar to said pair, said device exhibiting substantially no charge storage in response to the application of a forward current and maintaining a substantially uniform high back-impedance at all times, said device being coupled in series between one terminal of the primary winding and in series opposition to said body, having one of said two electrodes coupled to a similar one of said pair of electrodes such that the secondary winding is coupled in series between the remaining similar electrodes of said set and set pair;

means for providing an insubstantial forward current to said semiconductive body to effect substantially no enhancement charge storage, thereby causing said impedance switch to be characterized by relatively high effective impedance, or for providing a substantial forward current to said semiconductive body to effect the storage of a relatively large enhancement charge, thereby appreciably reducing the relatively high effective impedance of said switch;

and means for supplying a current through said secondary winding to effect a reverse current through said semiconductive body for removing therefrom substantially all of any stored enhancement charge, the arrangement being such that the voltage appearing across the secondary winding is large when the effective impedance of said switch is relatively high, and the voltage induced thereby into the primary winding is insufficient to cause breakdown of said semiconductive body, while when effective impedance of said switch is relatively low due to the storage of the substantial enhancement charge by said body, the voltage across said secondary winding is relatively low, but still of a magnitude to induce sufficient voltage in the primary winding to cause removal of substantially all of said stored enhancement charge, thereby returning said switch to a condition of relatively high impedance.

4. An impedance switch comprising:

one transformer having one primary winding, one secondary winding, and means for connecting said primary winding to a source providing substantial and insubstantial currents, said transformer having, and being operated on the slope of a substantially sloping characteristic curve which exhibits the transformer property of substantially zero residual flux;

a semiconductive body exhibiting substantial enhancement properties having a pair of dissimilar electrodes one of which is coupled to said means as to be in parallel with the primary winding;

a unidirectional current conducting device having a set of dissimilar electrodes which are similar to said pair, exhibiting at least substantially no enhancement properties coupled in series between the primary winding and said body in opposition to the latter, one of said set of electrodes being coupled to a similar one of said pair of electrodes such that the secondary winding is coupled in series between the remaining of said set and said pair of electrodes;

means for providing an insubstantial forward current to said semiconductive body for causing said switch to have a relative high effective impedance, or for providing a substantial current to said semiconductor body to cause to be stored a relative large enhancement charge and reduce said relatively high impedance;

and means for supplying a current through said secondary winding to effect a reverse current through said body for removing therefrom at least a large part of said enhancement charge, the arrangement being such that the voltage across the secondary winding is large when the effective impedance thereof is relatively high and the voltage induced thereby in the primary winding is insufficient to cause breakdown of said semiconductive body, while when the effective secondary impedance is reduced due to said enhancement charge, the voltage across that secondary winding is relatively low, but the voltage induced thereby in the primary winding is sufficient to cause an enhancement current from said semiconductive body to remove said enhancement charge at least substantially, thereby returning said switch at least substantially to said relatively high impedance.

5. A transfer circuit comprising:

at least one transformer having at least one primary winding and at least one secondary winding, said transformer having and being operative on the slope of a substantially sloping characteristic curve;

means including a unidirectional current conducting device serially coupling said primary winding to a source of "zero" and "one" input signals;

a semiconductive body exhibiting substantial enhancement properties coupled in a forward direction with respect to said "one" signals and in parallel with said means so that said device and body are in opposition and in a series loop with said primary winding, said "zero" and "one" signals causing respectively substantially no, or a relatively large enhancement charge in said body which, in turn, effects different effective impedances in said transformer;

means for supplying at least one signal to said secondary winding;

and a load coupled to said source, the arrangement being such that the input signals are effectively transferred to the load in accordance with the impedance of said transformer.

6. A transfer circuit as in claim 5 and further including threshold means for at least assisting the causing of a full and true transfer of the input signals in a complementary sense.

7. A transfer circuit as in claim 6 and further including a second unidirectional current conducting device in a second series loop including the secondary winding and said load to the exclusion of the secondary signal supply means, said second device being oriented to be substantially non-conductive as to false "one" signals and during the occurrence of "zero" output signals, said orientation providing further that current from said threshold means is prevented from flowing into said signal supply means;

and a third unidirectional current conducting device being in series at least with said load and signal supply means and forms a part of the second series loop.

8. A transfer circuit as in claim 5 wherein the load is in series with the secondary winding, the output signals received by the load being non-complements of the input signals.

9. A transfer circuit as in claim 8 and further including means for at least substantially precluding the receipt of a false "one" output signal by the load when a "zero" input signal is being transferred.

10. A transfer circuit as in claim 9 wherein the precluding means includes threshold means in parallel with said load for providing a signal amplitude which only when exceeded by the amplitude of an output signal allows a true "one" signal to be received by the load.

11. A transfer circuit as in claim 9 wherein the precluding means includes unidirectional impedance means and biasing means connected in series as to each other and in parallel with said load, the arrangement being such that an output signal from said secondary winding flows through said impedance means until such time that the voltage across the impedance means exceeds the voltage of said biasing means at which time said load receives a true "one" output signal.

12. A transfer circuit as in claim 5 wherein a "one" input signal stores an enhancement charge in said semiconductive body, and further including means for substantially removing said charge if any remains after receipt by said secondary winding of a signal from a secondary signal supply means.

13. A transfer circuit as in claim 12 wherein the charge removing means includes a source of voltage backwardly biasing said semiconductive body.

14. A transfer circuit as in claim 5 and further including a second load, said loads being serially coupled and in a series loop with said secondary winding whereby both loads are traversed by the same output signal.

15. A logical circuit comprising:
at least two transformers each having a primary and secondary winding;
means for each transformer including unidirectional current conducting devices for serially coupling the respective primary windings to two sources each having "zero" and "one" input signals;
two semiconductive bodies each exhibiting substantial enhancement properties forwardly coupled and parallel respectively with said means so that the associated devices and bodies are in opposition to each other, and in a series loop with the respective primary windings, said "zero" and "one" signals causing respectively substantially no, or a relatively large enhancement charge in said body which, in turn, effects different effective impedances in said transformer;
means for supplying at least one signal to said secondary winding in parallel;
and a load coupled to parallel with each of the secondary windings and in series with the secondary signal supply means, the arrangement being such that said loads receive an output signal which has a predetermined polarity relationship with respect to the input signal presented to said semiconductive bodies.

16. A logical circuit as in claim 15 wherein an enhancement charge is stored in either of the semiconductive bodies when same respectively receive a "one" input signal, and further including means for at least substantially removing the charge in either of the bodies if any remain after receipt by said secondary winding of a signal from the secondary winding supply means.

17. A transfer circuit comprising:
at least two transformers each having at least one primary and secondary winding, the secondary winding of the first transformer being coupled in a series loop with a primary winding of the second transformer;
first and second semiconductive bodies exhibiting substantial enhancement properties coupled respectively across the primary windings;
unidirectional current conducting devices coupled in series respectively between the semiconductive bodies and the associated primary windings;
means for forwardly coupling the first semiconductive body to a source of "zero" and "one" input signals, said "zero" and "one" signals causing respectively substantially no, or a relatively large enhancement charge in said body which, in turn, effects different effective impedances in said first transformer;
means for supplying at least one signal of a first phase to the secondary winding of said first transformer and through the second semiconductive body;
at least one load coupled to the secondary winding of said second transformer;
a source of voltage in said series loop and in series with said load;
and means for supplying at least one signal of a second phase to the secondary winding of said second transformer, the arrangement being such that after receipt of an input signal, the signal of the first phase causes an output to the second semiconductive body after which the signal of the second phase causes an output to said load, all as a result of an input signal to the first semiconductive body, and said source of voltage operating to effect a reverse current through the semiconductive bodies during a time other than occurrence of the first phased signal.

18. A transfer circuit as in claim 17 and further including:
a third transformer having at least one primary and secondary winding;
a third unidirectional current conducting device;
a third semiconductive body exhibiting enhancement properties, the third body being coupled in said series loop, said third unidirectional device and primary winding of the third transformer being connected in series and across the third semiconductive body;
a second load coupled to the secondary winding of said third transformer and in series with said source of voltage;
and means for supplying to the secondary winding of said third transformer at least one signal of said second phase.

19. A cascaded transfer circuit comprising:
at least two transformers each having at least one primary and secondary winding;
first and second semiconductive bodies exhibiting substantial enhancement properties coupled across the primary winding respectively;
two unidirectional current conductive devices connected serially between the semiconductive bodies and associated primary windings respectively;
means for forwardly coupling the first semiconductor body to a source of "zero" and "one" input signals;
means for supplying at least one signal of phase one to the secondary winding of the second transformer;
an output circuit coupled to the secondary winding of said second transformer;
means for supplying a scavenging signal of phase two to the second semiconductive body;
means for supplying at least one signal of phase three to the secondary winding of the first transformer;
and means for supplying a scavenging signal of phase four to the first semiconductive body, the arrangement being such that a "one" input signal to the first semiconductive body stores an enhancement charge therein, and a "one" output signal effected by the signal of phase three stores an enhancement charge in the second semiconductive body, the signal of phase one effecting an output from the second transformer, and the scavenging signal of phases two and four causing at least substantial removal of said enhancement charges, respectively, if any remains at the time of their occurrence, the input signal being transferred to said output circuit on the successive occurrence of signals of phase three and phase one.

20. A cascaded transfer circuit comprising:
at least two transformers having at least one primary winding and first and second secondary windings;
first and second semiconductive bodies exhibiting substantial enhancement properties, coupled across the primary windings respectively;

two unidirectional current conducting devices connected in series respectively between the associated semiconductive bodies and primary windings;

means for forwardly coupling the first semiconductive bodies to the source of "zero" and "one" input signals, said "zero" and "one" signals effecting different effective impedances in the first transformer;

means for supplying at least one transfer signal of phase one to the first secondary winding of the first transformer;

means for supplying at least one transfer signal of phase two to said first secondary winding of the second transformer;

means for supplying at least one blocking signal of phase one to the second secondary winding of the first transformer;

means for supplying at least one blocking signal of phase two to the second secondary winding of said second transformer, the second secondary winding of said first transformer being coupled to said second semiconductive body;

and an output circuit coupled to said second secondary winding of the second transformer, the arrangement being such that an input signal through the first semiconductive body is transferred successively to said output circuit upon successive occurrences of said phase one and phase two signals.

21. A cascaded transfer circuit comprising:

a plurality of enhancement diode-transformer impedance switches;

means for coupling one of the impedance switches to a source of binary input signals which effect different effective impedances therein;

means for supplying at least one signal of a given phase to alternate impedance switches;

and means for supplying at least one signal of another phase to the remaining impedance switches, the arrangement being such that said input signals are transferred successively in a given sense from one switch to another upon the occurrence of said phased signal.

22. A circuit as in claim 21 wherein the diodes store an enhancement charge upon receipt of a given binary signal, and wherein there is included means for causing at least substantial removal of an enhancement charge.

23. A circuit as in claim 22 wherein the charge removing means includes means coupled to each of the enhancement diodes for scavenging the enhancement charge before the occurrence of the phased signal to the impedance switch immediately preceding the so scavenged diode.

References Cited in the file of this patent

UNITED STATES PATENTS

| | | |
|---|---|---|
| 2,652,501 | Wilson | Sept. 15, 1953 |
| 2,708,722 | An Wang | May 17, 1955 |
| 2,709,798 | Steagall | May 31, 1955 |
| 2,710,952 | Steagall | June 14, 1955 |
| 2,742,632 | Whitely | Apr. 17, 1956 |
| 2,805,409 | Mader | Sept. 3, 1957 |
| 2,817,057 | Hollmann | Dec. 17, 1957 |
| 2,846,667 | Goodell et al. | Aug. 5, 1958 |
| 2,850,722 | Loev | Sept. 2, 1958 |
| 2,866,178 | Lo et al. | Dec. 23, 1958 |
| 2,877,451 | Williams | Mar. 10, 1959 |

FOREIGN PATENTS

| | | |
|---|---|---|
| 413,383 | Great Britain | July 19, 1934 |

OTHER REFERENCES

"Diode Amplifier" National Bureau of Standards Technical News Bulletin, vol. 38, No. 10, pages 145–148, October 1954.